hH04W52/18 (2013.01); H04L 1/0021 (2013.01);

United States Patent
Ngai et al.

(10) Patent No.: US 9,313,711 B2
(45) Date of Patent: Apr. 12, 2016

(54) ENHANCED OUT-OF-SERVICE SCAN AND SYSTEM SELECTION FOR DUAL-SUBSCRIPTION, DUAL-ACTIVE DEVICES

(71) Applicant: QUALCOMM Incorporated, San Diego, CA (US)

(72) Inventors: Francis M. Ngai, Louisville, CO (US); Shyamal Ramachandran, San Diego, CA (US); Amit Mahajan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 215 days.

(21) Appl. No.: 14/015,264

(22) Filed: Aug. 30, 2013

(65) Prior Publication Data

US 2015/0063216 A1 Mar. 5, 2015

(51) Int. Cl.
*H04W 36/24* (2009.01)
*H04W 48/20* (2009.01)
*H04W 52/18* (2009.01)
*H04W 48/16* (2009.01)
(Continued)

(52) U.S. Cl.
CPC .............. *H04W 36/24* (2013.01); *H04W 48/16* (2013.01); *H04W 48/20* (2013.01); *H04W 52/18* (2013.01); *H04L 1/0021* (2013.01); *H04W 88/06* (2013.01)

(58) Field of Classification Search
CPC ..... H04W 36/24; H04W 48/16; H04W 48/20; H04W 52/18; H04W 88/06
USPC .................................................. 370/328, 329
See application file for complete search history.

(56) References Cited

U.S. PATENT DOCUMENTS

| 8,103,213 B2 | 1/2012 | Tolonen |
| 2004/0176039 A1 | 9/2004 | Leyh et al. |
| 2008/0026718 A1 | 1/2008 | Wangard et al. |

(Continued)

FOREIGN PATENT DOCUMENTS

| GB | WO 2005099174 A1 * | 10/2005 | ............ H04W 48/16 |
| WO | WO 2005099174 A1 * | 10/2005 | ............ H04W 48/16 |
| WO | WO 2007069210 A2 * | 6/2007 | ............ H04B 1/406 |

OTHER PUBLICATIONS

International Search Report and Written Opinion—PCT/US2014/053300—ISA/EPO—Nov. 21, 2014.
(Continued)

*Primary Examiner* — Un C Cho
*Assistant Examiner* — Shah Rahman
(74) *Attorney, Agent, or Firm* — The Marbury Law Group, PLLC

(57) ABSTRACT

A system, a method and an apparatus are described. The apparatus comprise a modem that determines frequencies at which a transceiver of a wireless device is susceptible to interference generated by a different transceiver of the wireless device, and that modifies a search for a radio access network based on the one or more frequencies. The first transceiver may be susceptible to the interference by means of transmission of the interference through one or more circuits within the wireless device. A threshold power level may be modified based on an estimate of the power of the interference. The threshold power level may be used to determine presence of a pilot signal. The interference may be modeled based on a list of frequencies associated with one or more subscriptions of the wireless device. An order of searching for pilot signals may be modified.

44 Claims, 9 Drawing Sheets

(51) Int. Cl.
*H04L 1/00* (2006.01)
*H04W 88/06* (2009.01)

(56) References Cited

U.S. PATENT DOCUMENTS

| | | | | |
|---|---|---|---|---|
| 2009/0082017 A1* | 3/2009 | Chang | ................... | H04B 1/406 |
| | | | | 455/435.2 |
| 2009/0190485 A1* | 7/2009 | Bjorkegren et al. | .......... | 370/252 |
| 2009/0316667 A1* | 12/2009 | Hirsch | ................... | H04B 1/406 |
| | | | | 370/338 |
| 2011/0300805 A1* | 12/2011 | Gaikwad et al. | ............. | 455/63.1 |
| 2012/0178402 A1 | 7/2012 | Krishnamoorthy et al. | | |
| 2012/0208528 A1 | 8/2012 | Wilhelmsson et al. | | |
| 2012/0264425 A1 | 10/2012 | Krishnamoorthy et al. | | |
| 2012/0329399 A1* | 12/2012 | Tokgoz et al. | ............... | 455/63.1 |
| 2013/0012135 A1 | 1/2013 | Ruohonen et al. | | |

OTHER PUBLICATIONS

3GPP, 3rd Generation Partnership Project; Technical Specification Group Services and Systems Aspects; Review of Network Selection Principles; (Release 7), Global System for Mobile Communications, 3GPP TR 22.811, V7.1.0 (Mar. 2006), 16 pages.

* cited by examiner

ENHANCED OUT-OF-SERVICE SCAN AND SYSTEM SELECTION FOR DUAL-SUBSCRIPTION, DUAL-ACTIVE DEVICES

BACKGROUND

1. Field

Various features relate to the out-of-service network acquisition for wireless mobile devices that have multiple transceivers.

2. Background

Wireless terminals typically comprise integrated semiconductor devices, which may also be referred to as integrated circuits (ICs), and which may include one or more processors, memories and modems used for wireless communications. An IC may be provided on a die in a package that includes one or more dice provided on a substrate, and some degree of electrical and thermal coupling exists between the dice. Each of the one or more dice may support a plurality of modems that operate independently, although some degree of interference may be experienced due to the close proximity of the modems and/or constituent components of the modems. For example, interference may be transmitted through parasitical capacitances and inductances and/or through electromagnetic coupling of conductive traces, including power and ground planes.

Interference can be problematic for wireless communication devices that support Dual-Subscriber Identity Module (SIM), Dual-Active (DSDA) modes of operation. In particular, during system selection and out-of-service (OOS) scans, one technology active in a DSDA device can produce interference that can desensitize the receiver of another technology used by the DSDA. A wireless device generally performs OOS scans for signals above a minimum power threshold, where the threshold determines whether a full-acquisition process is triggered. The minimum power threshold is generally based on signal and interference power levels anticipated in the air within a wireless coverage zone. The minimum power threshold can enable rapid service acquisition by single-active devices.

However, in DSDA devices, interference power between the technologies supported on the DSDA device can easily exceed the minimum power threshold, and may result in many false triggers and acquisition attempts. False triggers can degrade OOS power consumption by wireless devices. When DSDA devices follow conventional OOS scans and system acquisition processes, a modem of the DSDA device may select services that are afflicted by interference from another active technology in the device. This can lead to poor call performance, and, therefore, poor user experience.

Therefore, there is a need for an improved method for OOS scanning and system selection in DSDA devices.

SUMMARY

In an aspect of the disclosure, a method, a computer program product, and an apparatus are provided that can improve OOS scanning and system selection in DSDA devices. The apparatus may comprise a modem.

In an aspect of the disclosure, the modem may determine one or more frequencies at which a first transceiver of a wireless device is susceptible to interference generated by a second transceiver of the wireless device, and the modem may modify a search for a radio access network (RAN) conducted by the first transceiver based on the one or more frequencies. The first transceiver may be susceptible to interference by means of transmission of the interference through one or more circuits within the wireless device.

In an aspect of the disclosure, a search for a RAN may be modified by determining an estimate of a power level of the interference of the second transceiver, and increasing a threshold power level based on the estimate of the power level of the interference. The threshold power level may be used to determine presence of a pilot signal. A RAN may be selected for acquisition based on a power level of a radio frequency (RF) signal received by an antenna that exceeds the threshold power level. The threshold power level may have been increased from a first power level, which is greater than thermal noise power as measured in the first transceiver, to a second power level greater than the estimate of the power level of the interference.

In an aspect of the disclosure, the interference generated or induced in the first transceiver by the second transceiver may be modeled using a list of frequencies associated with one or more subscriptions of the wireless device. The list of frequencies may include frequencies corresponding to one or more recently connected RANs. The list of frequencies may include frequencies provided by a network operator to be used for searching for a RAN. In an aspect of the disclosure, an order of searching a plurality of frequencies identified in a list of frequencies may be modified. The order of searching the plurality of frequencies may be modified by prioritizing a first set of frequency bands that are identified as being free from interference from the second transceiver, and searching in the first set of frequency bands before searching in a second set of frequency bands that are not identified as being free from interference from the second transceiver. The second set of frequency bands may be searched if no acquisition candidate is found in the first set of frequency bands. The second set of frequency bands may be selectively searched for pilot signals that have a signal power level that exceeds a threshold power level based on an estimate of power of the interference if no acquisition candidate is found in the first set of frequency bands.

In an aspect of the disclosure, one or more frequencies may be searched for pilot signals while the wireless device is camped on a radio access network through the first transceiver. A network reselection may be performed when the search for RANs identifies a pilot signal and when the wireless device is camped through the first transceiver on a current RAN that is afflicted by interference. In an aspect of the disclosure, one or more frequencies may be searched for pilot signals while the first transceiver is out of service.

In an aspect of the disclosure, a processor-readable storage medium stores one or more instructions which cause a processing circuit to determine one or more frequencies at which a first transceiver of a wireless device is susceptible to interference generated by a second transceiver of the wireless device, and modify a search for a RAN conducted by the first transceiver based on the one or more frequencies The first transceiver may be susceptible to the interference by transmission of the interference through one or more circuits within the wireless device.

In an aspect of the disclosure, an apparatus for wireless communication includes means for determining one or more frequencies at which a first transceiver of a wireless device is susceptible to interference generated by a second transceiver of the wireless device, and means for modifying a search for a RAN conducted by the first transceiver based on the one or more frequencies. The first transceiver may be susceptible to the interference by transmission of the interference through one or more circuits within the wireless device.

In an aspect of the disclosure, an apparatus for wireless communication comprises a processing circuit configured to determine one or more frequencies at which a first transceiver of a wireless device is susceptible to interference generated by a second transceiver of the wireless device, and is configured to modify a search for a RAN conducted by the first transceiver based on the one or more frequencies. The first transceiver may be susceptible to the interference by transmission of the interference through one or more circuits within the wireless device.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
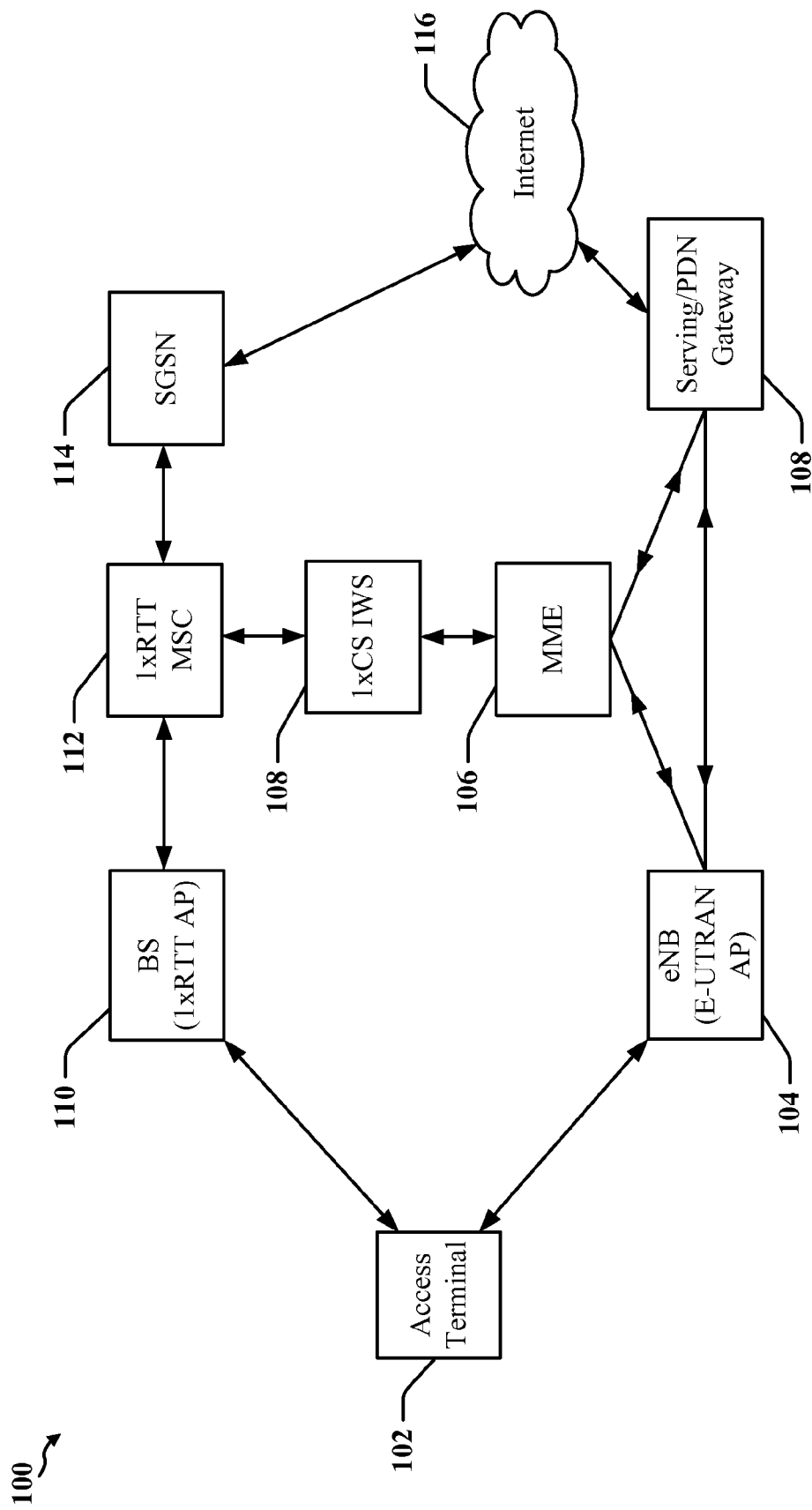
FIG. 1 is a diagram illustrating an example of a network architecture.

FIG. 1 is a simplified block diagram 100 illustrating a wireless networking environment. An access terminal 102 may be associated with one or more access points 104, 110. Access terminal 102 may comprise a cellular phone, a smart phone, a session initiation protocol (SIP) phone, a laptop computer, a personal digital assistant (PDA), a satellite radio, a global positioning system, a multimedia device, a video or audio streaming device, a video device, a digital audio player, a camera, a game console, a tablet, or any other similar functioning device. Access terminal 102 may be referred to as a mobile terminal, a wireless terminal, a remote terminal, a wireless terminal, user equipment (UE), a user agent, a wireless device, a wireless communications device, a mobile device, a mobile wireless device, a mobile station, a subscriber station, a handset, a mobile client, a wireless client, or some other suitable terminology.

An access point 104 and/or 110 may comprise, or be referred to, as a base station, a base transceiver station, a radio access point, an access station, a radio transceiver, a basic service set, an extended service set, a Node B, an evolved Node B (eNB), or some other suitable terminology. Two or more access points 104 and 110 may be operated by the same or different network operators. Each access point 104, 110 may provide a radio interface in a RAN that provides access to core network services provided by one or more network operators. RANs may be implemented using any suitable radio access technology (RAT) and telecommunication standards employing a variety of modulation and multiple access techniques. By way of example, RANs associated with access points 104, 110 may comprise one or more networks based on Universal Terrestrial Radio Access (UTRA) network employing code division multiple access (CDMA) or one of its variants, such as Wideband-CDMA (W-CDMA). Global System for Mobile Communications (GSM) employing TDMA, Time Division Synchronous Code Division Multiple Access (TD-SCDMA), Long Term Evolution (LTE) which includes a set of enhancements to the Universal Mobile Telecommunications System (UMTS), Evolved UTRA (E-UTRA) network, IEEE 802.11 (Wi-Fi), IEEE 802.16 (WiMAX), IEEE 802.20, and Flash-OFDM employing OFDMA. RANs may also comprise one or more Evolution-Data Optimized (EV-DO) or Ultra Mobile Broadband (UMB) networks.

In the depicted example, the access terminal 102 may be associated with a packet-switched (PS) network, such as LTE, through the eNB 104 and with a circuit-switched (CS) network for data and voice calls through the base station 110. The access terminal 102 may be registered with the E-UTRAN (through eNB 104). A packet data network (PDN) gateway 110 may provide connectivity between the access terminal 102 and one or more external packet data networks 116. The access terminal 102 may be registered with the 1×RTT CS network (which may be referred to as a 1× network) through a base station 110 in order to obtain voice and data services through a CDMA-2)) network, for example. In one example, a general packet radio service (GPRS) system permits 2G, 3G and W-CDMA mobile networks to transmit IP packets to external networks such as the Internet 116 using a gateway function or entity which may comprise a serving GPRS support node (SGSN) 114. The SGSN 114 may provide certain interworking services enabling communication between the GPRS system and external packet switched networks 116. Certain aspects of the invention are equally applicable to other combinations of PS and CS networks, including GSM for example.

The access terminal 102 may be deployed in a location where multiple accessible cells or RANs are available and the access terminal 102 may use different frequencies and/or different RATs to access a core network that provides mobility management, session management, transport for Internet Protocol (IP) packet services, and other services. RATs may be based on UMTS, TD-SCDMA, GSM, CDMA2000 and WiMAX.

Figure 2:
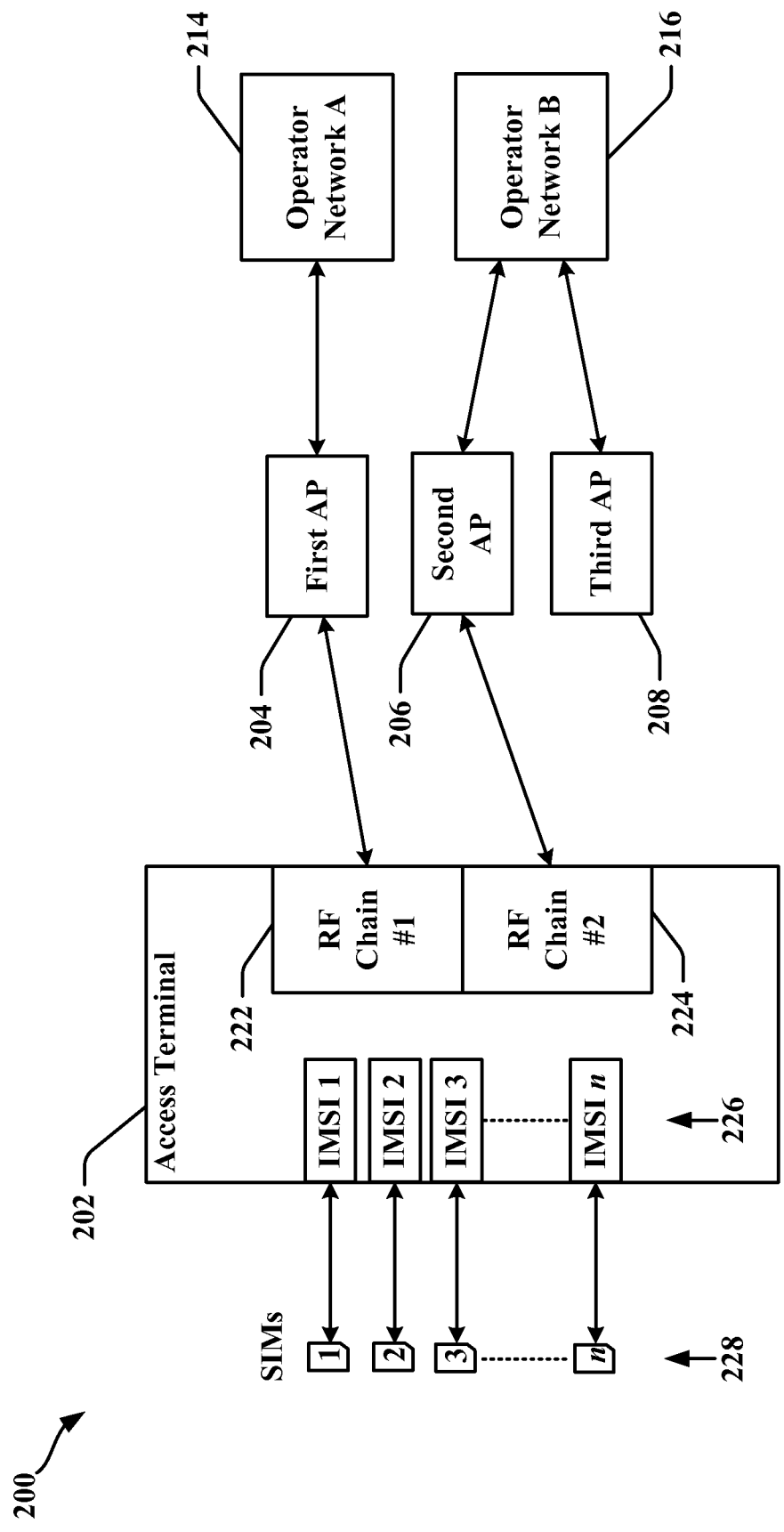
FIG. 2 is a diagram illustrating a wireless device with multiple transceivers and/or RF chains.

FIG. 2 is a diagram illustrating an access terminal 202 adapted to operate concurrently in multiple networks. The access terminal 202 may receive services provided by one or more core networks 214 and 216 operated by one or more network operators. The access terminal 202 may communicate with a first access point 204 to obtain services from a first network 214 and with a second access point 206 to obtain services from a second network 216. The access terminal 202 may obtain services from a single network through two or more access points 204, 206 and/or 208. For example, the access terminal 202 may communicate with the second access point 206 and the third access point 208 to obtain services from the second network 216. Each network 214 and 216 may provide voice and/or data services through one or more RANs operated by the same or different network operators.

The access terminal 202 may be adapted or configured to support two or more SIMs 228 that can be used to identify and authenticate subscribed users of the different services offered by network operators. In one example, each SIM 228 may store an international mobile subscriber identity (IMSI) 226 and related keys that can uniquely identify and authenticate a user of the access terminal 202 and subscribed services available to the user through networks 214 and/or 216. Each SIM 228 may be associated with a subscription that includes a telephone number or other network identifier different from telephone numbers or other identifiers associated with the other SIMs 228. In one example, an access terminal 202 may comprise a mobile telephone device equipped with two or more SIM cards 228 that enable the establishment of calls on two or more different voice and/or data networks, and to maintain two or more active calls concurrently. The use of multiple SIM cards 228 may permit a user of the access terminal 202 to access and use features of different subscriptions to reduce costs, obtain superior service, etc.

The access terminal 202 may support a variety of operational modes when multiple SIMs are installed in the access terminal 202. For example, in dual SIM stand-by (DSS) mode, the access terminal 202 may initially be in standby mode for two different subscriptions. After establishing a call through one RAN 214 or 216, the access terminal 202 may cause the connection between access terminal 202 and the other RAN 216 or 214 to enter an inactive state.

In dual SIM dual active (DSDA) mode, the access terminal 202 may be concurrently connected to two different networks 214 and 216. A DSDA-enabled access terminal 202 may be capable of switching between two active calls and/or connecting two active calls at the access terminal 202. In DSDA mode, the access terminal 202 may establish a first active call on a first network 214, while remaining idle on a second network 216. While a call is active on a first subscribed network 214 or 216, a DSDA-enabled access terminal 202 may receive a second call through a second subscribed network 216 or 214. If calls are active on the first and second subscribed networks 214 and 216, a user may switch between the two calls as desired, and/or may connect the two calls at the access terminal 202. When more than two SIMs 228 are installed in access terminal 202, other modes of operation may be defined, including triple SIM dual active (TSDA) mode, quad SIM dual active (QSDA) mode, for example.

A DSDA-enabled access terminal 202 may comprise a plurality of RF chains 222 and 224. Each RF chain 222 and 224 may be operated and used for establishing and maintaining an active connection with an access point 204, 206, or 208. The plurality of RF chains 222, 224 may be embodied in one or more RF modems. An RF modem may comprise one or more RF chains 222, 224, each having at least one power amplifier (PA). In the example depicted in FIG. 2, the access terminal 202 may employ two RF chains 222, 224 to support concurrent connections to different access points 204 and 206 corresponding to the operator networks 214 and 216, respectively. An RF modem may additionally comprise one or more processors, non-transitory storage and logic configured to process, transmit and receive signals, and to encode and decode data transmitted and received by the access terminal 202.

A dual-active access terminal 202 may permit only two active concurrent connections. When more than two SIMs 228 are installed on an access-terminal 202, and calls associated with two subscriptions are active on the two RF chains 222, 224 concurrently, at least one other subscription may be declared to be out-of-service (OOS). When one of the active calls is terminated and an RF chain 222 or 224 becomes available, the access terminal 202 may attempt to identify and acquire a suitable network for any OOS subscriptions.

The access terminal 202 may maintain one or more lists of frequencies, bands of frequencies, subbands, channels comprising one or more bands of frequencies, and/or subchannels that may be searched for suitable service when a subscription associated with the access terminal 202 is OOS. For example, a network operator may provide a list of one hundred or more bands and subchannels that may be used to effect an efficient search for suitable wireless service. The network operator that provides the list may be the operator of a home network of the access terminal 202, or an operator of a network 214 or 216 to which the access terminal 202 is currently attached, or was previously attached. The access terminal 202 may maintain a list of recently connected networks 214, 216. In one example, the list may include the ten most recent bands and/or subchannels used in association with one or more subscriptions of the access terminal 202. In another example, the list may also include preferred bands and/or subchannels associated with one or more subscriptions of the access terminal 202.

Figure 3:
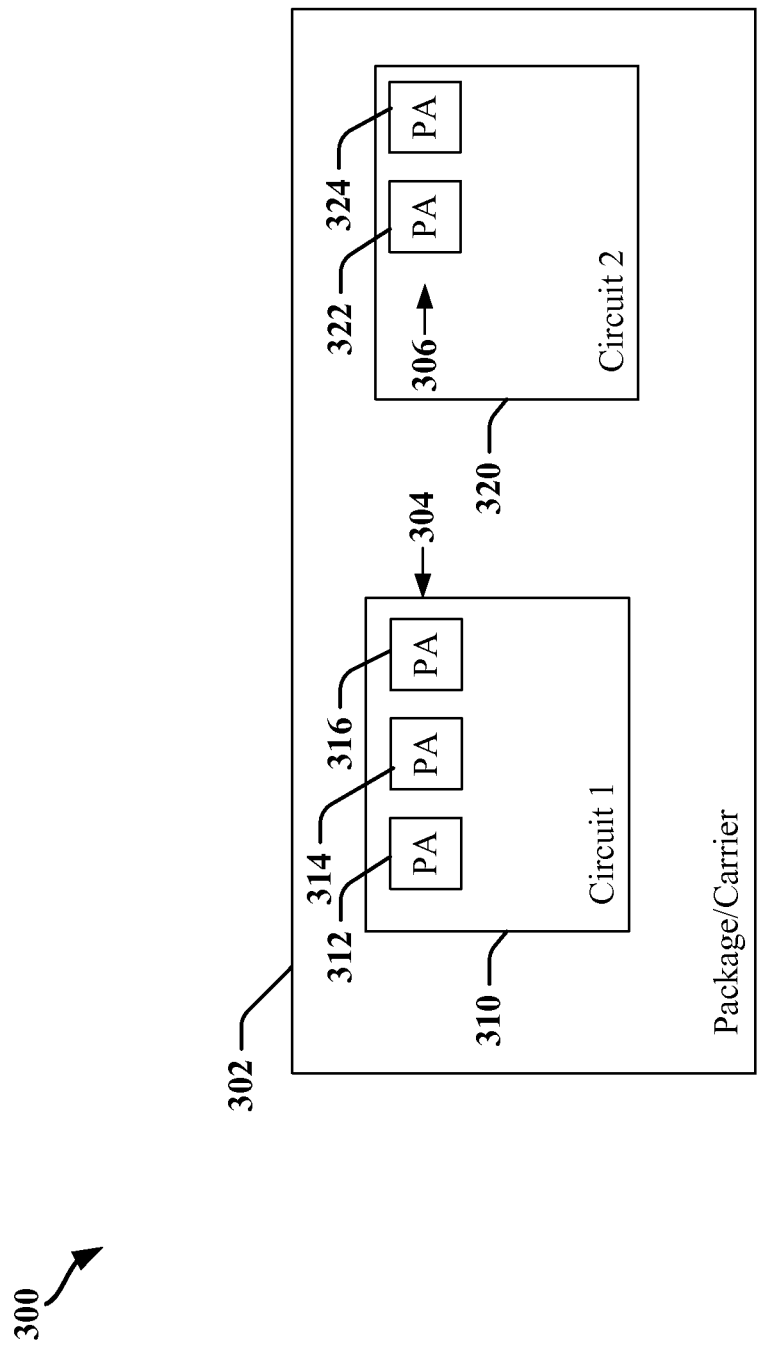
FIG. 3 is a diagram illustrating a first configuration of circuits in a wireless device.

FIG. 3 is a schematic illustration 300 of one example of the physical relationship between modem components in an access terminal 202. The access terminal 202 may include one or more transceivers of an RF modem, which may be deployed on multiple dice or circuits 310 and 320 on or within a package or chip carrier 302. The one or more transceivers may include a plurality of PAs 312, 314, 316, 322 and/or 324, each of which may be configured to operate in a subband of bandwidth allocated to a network connection. In one example, PAs 312, 314, and 316 may be provided in a transceiver in a first circuit 310, while PAs 322 and 324 are provided in a transceiver in a second circuit 320. The circuits 310 and 320 may be provided in one or more integrated circuit (IC) devices, and may be collocated on a single die and/or chip carrier or package 302. The first and second transceivers may comprise RF chains 222 and 224, respectively, and each circuit 310 and 320 may be associated with one or more wireless connections and/or with corresponding network subscriptions defined by the SIMs 228 installed in the access terminal 202. In one example, the circuits 310 and 320 are deployed on physically separate dice within the same package/chip carrier 302. In another example, the circuits 310 and 320 and/or one or more groups of the power amplifiers 304 and 306 may be provided in distinct devices mounted on a circuit board within the access terminal 202.

Each circuit 310 and 320 may be connected to an antenna and/or may receive or transmit RF signals using one or more of PAs 312, 314, 316, 322 and 324. These RF signals may be a source of RF interference within and between circuits 310, 320, or other devices and circuits within the package 302. RF interference may be generally defined as any undesirable effect generated in a first circuit 310 by transmission of an RF signal through a second circuit 320. In particular, an interference signal may be introduced to the first circuit 310 from the second circuit 320 as a result of parasitic or stray capacitive, inductive, or conductive coupling between the first circuit 310 and the second circuit 320. An interference signal may be introduced to the first circuit 310 from the second circuit 320 through collocated antennae and/or by electromagnetic coupling of interconnections within a package or chip carrier 302. The interference signal may be indirectly introduced to the first circuit 310 through power, ground and other signals within the dice 310, 320 and/or the package 302. PAs 312, 314, 316, 322 and 324 may be associated with generation of RF interference because the amplified outputs of the PAs 312, 314, 316, 322 and 324 may introduce an interference signal that has greater energy than signals generated by other components of circuits 310 or 320.

An interference signal may affect the performance of the access terminal 202, particularly when two or more RF chains 222, 224 operate at the same frequencies or in the same frequency bands. For example, an interference signal may comprise one or more RF components with sufficient energy to be interpreted as a signal received from an access point 204, 206, or 208.

Figure 4:
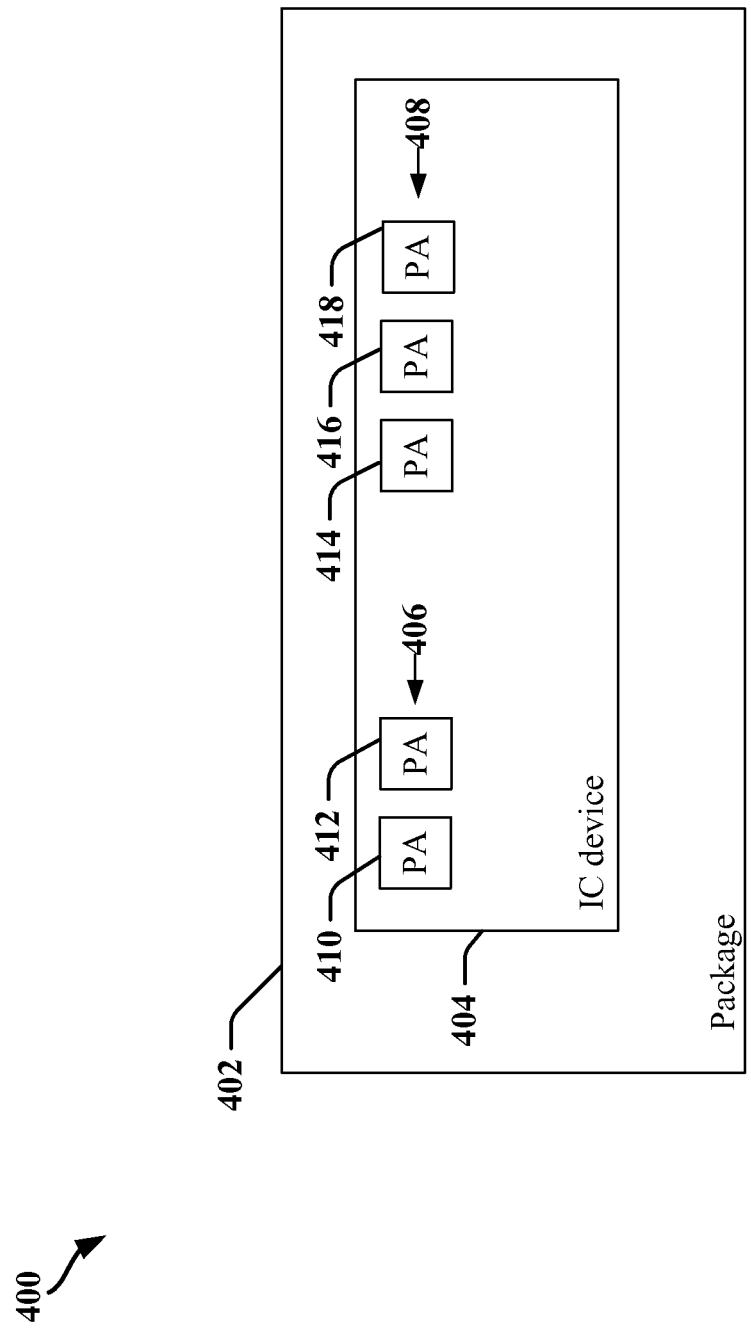
FIG. 4 is a diagram illustrating a second configuration of circuits in a wireless device.

FIG. 4 is a schematic illustration 400 of another example of the physical relationship between modem components of an access terminal 202. The access terminal 202 may comprise one or more transceivers of an RF modem that are provided in single IC device 404 within a package 402. Each RF modem may include a plurality of PAs 410, 412, 414, 416 and/or 418, some of which may be connected to an antenna and/or may receive or transmit RF signals. The RF signals may be coupled to power, ground and other signals within the IC device 404 and/or package 402, and may introduce an interfering RF signal to one or more components within IC device 404. The interfering RF signal may affect the performance of access terminal 202, particularly when two or more RF chains 222, 224 operate at the same frequencies or in the same frequency bands.

The IC device 404 may include a plurality of PAs 410, 412, 414, 416 and 418. Each PA 410, 412, 414, 416 and 418 may be configured to operate in one or more subbands of bandwidth allocated to a network connection. The PAs 410, 412, 414, 416 and 418 may be divided and assigned to different PA groups 406 and 408, which may correspond to RF chains 222, 224. Accordingly, the PA groups 406 and 408 may be directly associated with one or more wireless connections and/or with corresponding network subscriptions defined by the SIMs 228 installed in the access terminal 202.

With continued reference to FIGS. 2, 3 and 4, conventional techniques for decoupling collocated PA groups 304 and 306 and/or collocated PA groups 406 and 408 from one another may be inadequate to prevent interference that affects the performance of access terminal 202. In general, RF interference may be reduced to some degree using high-frequency decoupling techniques known in the art, and/or using electromagnetic shielding. However, conventional decoupling techniques may lack effectiveness when interference occurs between PAs 312, 314, 316, 322, and 324 in the same package 302, or between PAs 410, 412, 414, 416 and 418 provided on a single IC device 404 in package 402.

Interference between devices within the same package 302 or 402 and/or within the same IC 310, 320, 404 may be communicated and/or generated by parasitic elements such as resistances, inductances and capacitances. Such interference may exceed thermal-effect noise levels observed in a receiver of the access terminal 202. The access terminal 202 may initiate network acquisition based on detection of certain target frequencies above thermal-effect noise levels, which are attributable to coupling of RF signals between the RF chains 222 and 224 and/or two or more PAs 312, 314, 316, 322 and 324, or two or more PAs 410, 412, 414, 416 and 418. Power consumption by the access terminal 202 may be increased and longer acquisition times may be experienced due to RF interference caused by internal coupling of RF chains 222 and 224 and other devices within the access terminal 202.

Figure 5:
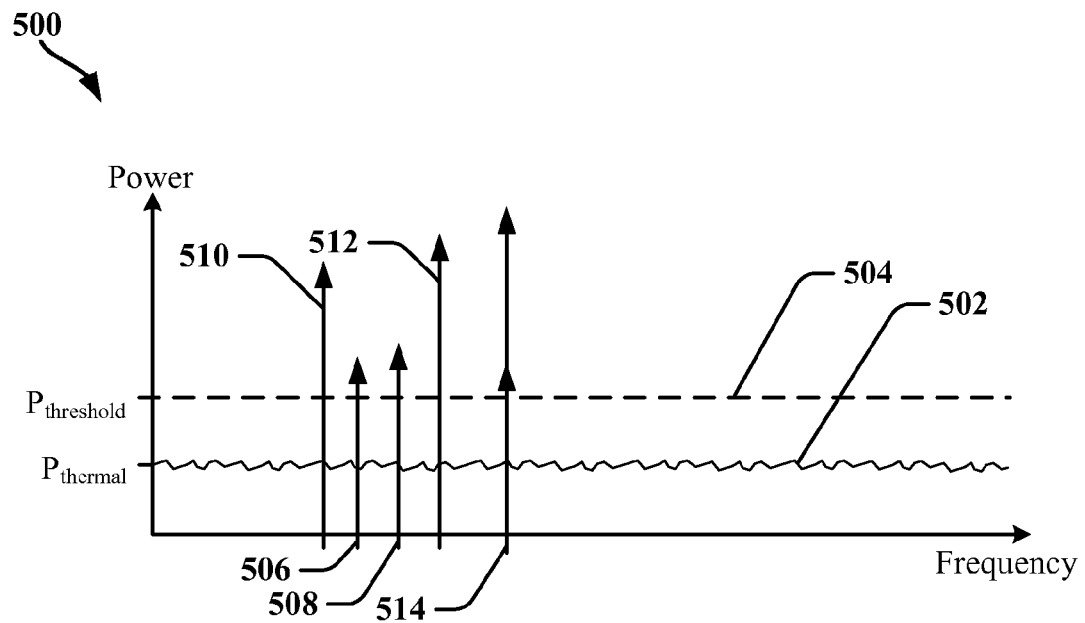
FIG. 5 graphically depicts techniques for avoiding the effects of interference observed in a wireless device according to certain aspects of this disclosure.
Figure 5:
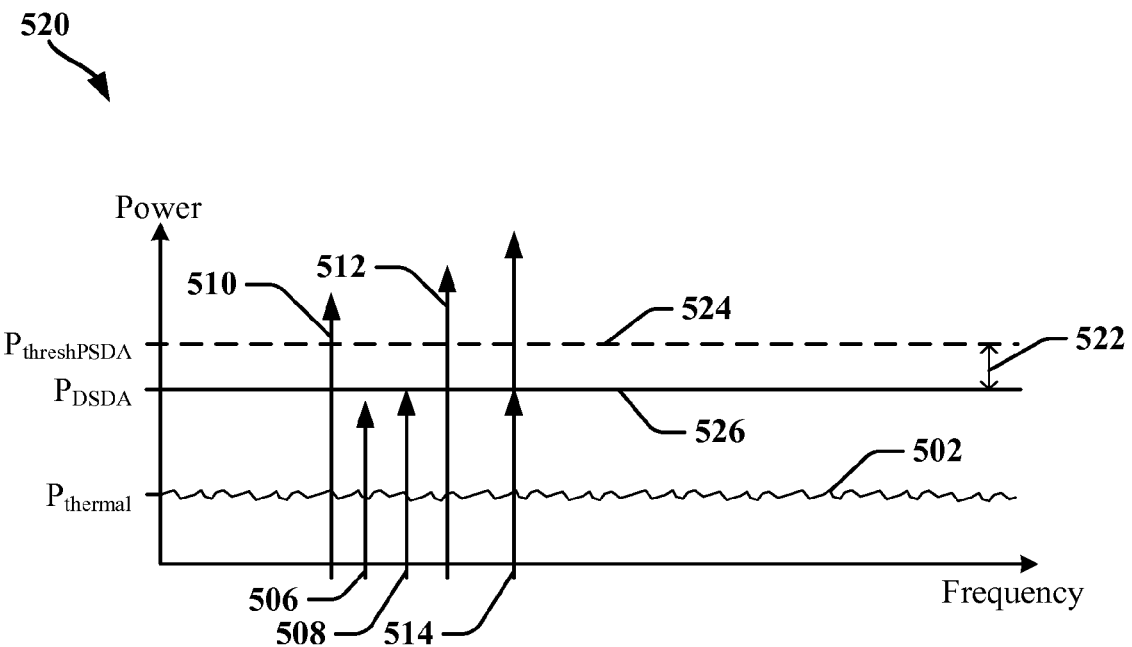

FIG. 5 includes a graphical illustration 500 of interference that may be observed in a wireless device 202. Thermal-effect noise may have a significant power level 502 across a broad range of frequencies. Accordingly, the access terminal 202 may be configured to search in frequency bands or channels for any pilot signals 510 and 512 present in the channel that exceed a preconfigured threshold power level 504 that exceeds the thermal noise level 502. A signal may be determined to be a pilot signal when it has sufficient energy and lies within a predefined band of frequencies. In the illustrated example 500, the detected signals 510 and 512 may be valid pilot signals, while interference signals 506 and 508 are introduced by another RF chain 222 or 224 of the access terminal 202. In this example, acquisitions may be attempted based on detection of interference signals 506 and 508. In particular, the access terminal 202 may initiate an acquisition process when the interference signals have a power level that exceeds the threshold power level 504 at a recognized pilot signal frequency 506 or 508.

Even if a valid pilot signal is present at the same frequencies as an interference signal 506 or 508, it is likely that an acquisition of a RAN associated with frequency 506 or 508 may be afflicted by interference. For example, it is possible that a network can be acquired when acquisition is triggered by a signal 514 that is a combination of pilot and interference signals. In the latter instance, service may be available and acquired using bands or subchannels identified by the pilot/interference signal 514, although the quality of the connection may be impaired by the interference portion that originates with an RF chain 222 or 224 of the DSDA-enabled access terminal 202.

FIG. 5 also includes a graphical illustration 520 in which the effect of interference between RF chains 222 and 224, and other circuits of access terminal 202 is addressed. In the example 520, a modified threshold power level 524 may be set based on an expected, calculated or measured power level 526 of interference generated by an RF chain 222 or 224 in a DSDA-enabled access terminal 202. The threshold power level 524 may be applicable for OOS scans in one or more bands and/or channels 506, 508, 514 where an RF chain 222 or 224 is expected or anticipated to be a source of interference. Threshold power level 524 may exceed the power level of interference in certain bands or channels 506, 508, or 514. Threshold power level 524 may be configured based on measured or estimated interference power in one or more access terminals 202.

In one example, interference between the RF chains 222 and 224 associated with multiple subscriptions in a DSDA-enabled access terminal 202, referred to as DSDA-interference, may be modeled in order to obtain an estimate of the maximum expected power level ($P_{DSDA}$) 526 corresponding to the interference between the RF chains 222 and 224. Based on the estimation of maximum DSDA-interference power 526, a modified threshold power level 524 may be configured for OOS scans. The modified threshold power level ($P_{threshPSDA}$) 524 may be selected at a level that includes an offset 522 over the estimated DSDA-interference power 526. The offset 522 may comprise one or more of a percentage of DSDA-interference power 526, a predefined minimum offset 522, and a value determined based on characteristics of modeled DSDA-interference at the frequencies 506 and 508. In one example, offset 522 may include a component based on a measured or estimated peak-to-average-power ratio of DSDA-interference in channels 506 and 508. In some embodiments, different threshold values 524 may be set for different channels, bands or frequencies 506, 508, 510, and/or 512.

Interference may be modeled by performing one or more calculations of interference power at each frequency or frequency band under consideration. The calculations may use an empirically-derived model, or a model obtained from device simulations. Empirically derived models may be generated based on tests performed on samples of manufactured devices.

In certain embodiments, an OOS scan may be selectively performed using one or more lists of frequency bands and/or communications channels comprising subbands of frequencies. The lists may identify band and channel preferences of a network operator and may include bands and channels identified by an access terminal 202 as less likely to be afflicted by interference attributable to coexistence of multiple RF chains 222 and 224 in a DSDA-enabled device 202. The DSDA-enabled device 202 may maintain lists identifying bands and channels used for prior connections. In one example, a list of bands and channels provided by a network operator for OOS scanning may be divided into two groups. A first group of bands and channels 510, 512 may be unlikely or less likely than other bands or frequencies 506, 508 and/or 514 to give rise to co-existence issues. A second group of bands and channels 506, 508, 514 may be associated with co-existence issues. Bands and channels may be further arranged in order of increasing estimated or measured interference power. In certain embodiments, a DSDA-enabled device 202 may initially search and/or attempt to camp on systems from a first group of frequencies, including frequencies associated with pilot signals 510, 512, whose members are not expected to have coexistence issues. If a suitable candidate is not discovered in the first group, the DSDA-enabled device 202 may then search the second group of frequencies, including frequencies associated with interfering signals 506, 508 and 512. When searching the second group of frequencies 506, 508 and 512, the DSDA-enabled device 202 may selectively apply the modified threshold power level 524 and/or may attempt to preempt the potential coexistence issues associated with the second group through interference cancellation, for example.

Lists maintained for OOS scanning may be used for RAN reselection processes. For example, a DSDA-enabled device 102 (see FIG. 1) that is camped on a first network 114 or 116 using a band/channel that is afflicted by interference may detect the presence of one or more other RANs that are not afflicted by interference issues and may autonomously reselect a system without interference issues.

Figure 6:
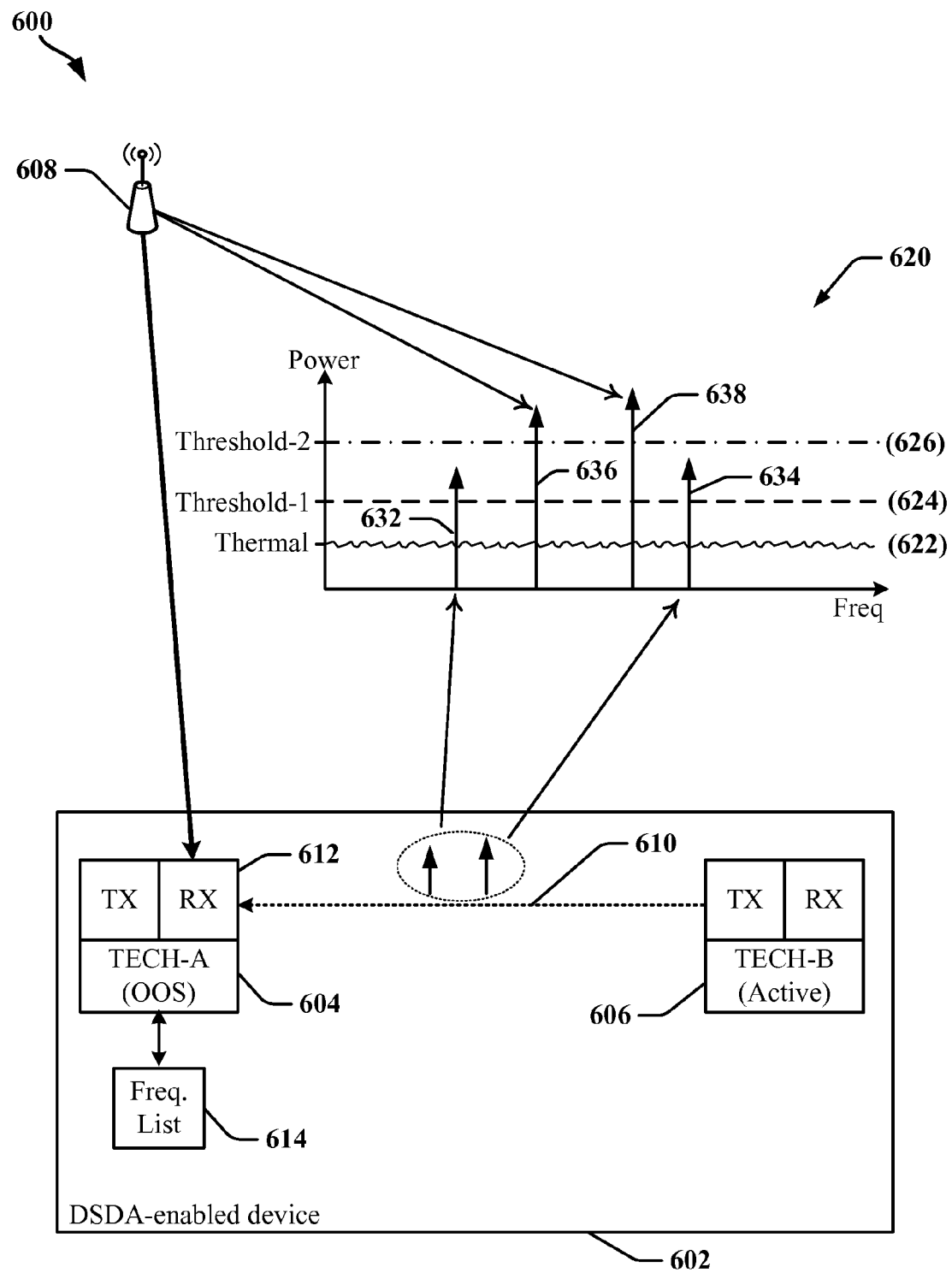
FIG. 6 is a schematic diagram illustrating the behavior of a wireless device during out-of-service scanning.

FIG. 6 is a simplified diagram 600 illustrating the behavior of a DSDA-enabled device 602 during OOS scanning. In the example, a wireless device 602 comprises a first transceiver 604 that is configured to support a first radio access technology (RAT), referred to herein as TECH-A, and a second transceiver 606 that is configured to support a second RAT, referred to herein as TECH-B. The first transceiver 604 may be idle or inactive while the second transceiver 60 is active. The second transceiver 606 may generate interference in one or more components or circuits of the first transceiver 604 that may affect the operation of the first transceiver 604. For example, one or more power amplifiers, clock generators, modulators and/or demodulators may generate interference signals 632 and 634 in bands or channels that are of interest to the first transceiver 604. Interference signals 632 and 634 may be communicated parasitically through electrical or electromagnetic circuits and paths 610 within device 602. The first transceiver 604 may be desensitized by the interference 632, 634 produced by the second transceiver 606, or by other components of the DSDA-enabled device 602.

In one example, interference 632 and 634 may have an estimated or measured power level that is 10-20 dB above the thermal noise level 622 associated with the receiver 612 of the first transceiver 604. The power level of the interference 632 and 634 may exceed the threshold power level 624 used to trigger acquisition attempts in single subscription devices. However, a DSDA-enabled device 602 using a threshold power level 626 may attempt to acquire a RAN through the first transceiver 604 based on detection of transmission power in channels or bands 632 and 634, which are attributable to interference produced by the second transceiver 606. Accordingly, excess power may be expended to acquire a non-existent or interference-afflicted RAN that uses bands or channels 632 and 634.

According to certain aspects described herein, a modified acquisition threshold 626 may be set above the estimated or measured power of interference generated by the second transceiver 606 during a search for pilots in frequency bands associated with the second transceiver 606. The DSDA-enabled device 602 may consequently ignore signals in channels or bands 632 and 634 which fall below the modified acquisition threshold 626, and the DSDA device 602 may employ OOS scan optimization as described herein to avoid attempts at full-blown acquisitions triggered by interference attributable to second transceiver 606. However, acquisition attempts may be properly triggered when a usable system is detected from signals 636 and 638, which may be received from a base station 608 with power levels above the increased threshold 626. In one example, threshold 626 is selected to be 10-20 dB above estimated or measured power of interference 642 and 644.

In some embodiments, the DSDA device 602 may be adapted to use system selection optimizations as disclosed herein. In conventional systems, a DSDA device 602 may attempt to acquire each provisioned system detected. According to certain aspects disclosed herein, a DSDA device 602 may be adapted or configured to initially attempt to acquire RANs and/or RATs that are not likely to be afflicted by interference 632, 634, based on categorization of RANs or RATs in one or more lists 614. If DSDA device 602 is unable to acquire a network that is categorized as unlikely to be afflicted by interference generated by the second transceiver 606 or other component of device 602, then the DSDA device 602 may attempt to acquire a RAN or a RAT that is more likely to be afflicted by such interference. In one example, attempts to acquire RANs or RATs that are more likely to be afflicted by interference from the second transceiver 606 may be made using the modified acquisition threshold 626, and/or by applying interference cancellation techniques. In some embodiments, the list 614 prioritizes radio access systems arranged in order of increasing interference power.

In some embodiments, RAN reselections may be performed by the DSDA device 602 based on the one or more lists 614. Conventionally, the DSDA device 602 may continue to camp on a RAN afflicted by interference. However, a DSDA device 602 adapted to use certain of the techniques disclosed herein may be configured to autonomously re-select a RAN with low or lower expectations of interference issues when a pilot signal of the RAN with low or lower expectations of interference issues is detected. The pilot signal of the RAN with low or lower expectations of interference issues may be detected when the wireless device is camped through the first transceiver on a RAN that is afflicted by interference, and/or when a search for a RAN detects a pilot signal associated with low or lower expectations of interference issues. A list 614 prioritizing systems arranged in order of increasing interference power may be employed to determine whether reselection should be performed.

Figure 7:
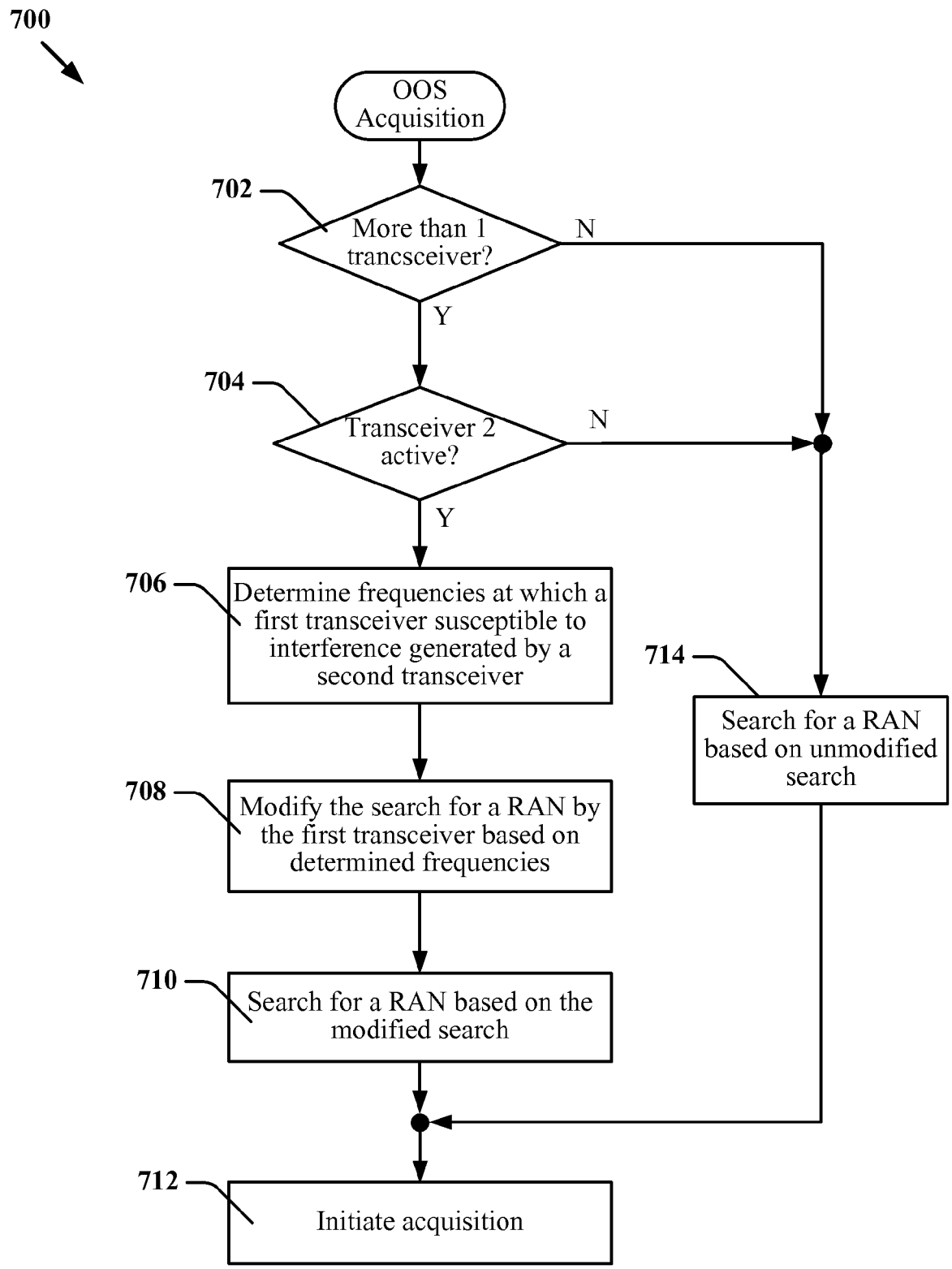
FIG. 7 is a flow chart illustrating a first example of a method for enhanced out-of-service frequency scanning and system selection for dual-subscription, dual-active devices.

FIG. 7 is a flowchart 700 illustrating a method of wireless communication, applicable to a wireless communication device such as access terminal 202 that comprises two or more transceivers, each transceiver having at least one RF chain 222 and 224. The method may be performed for network acquisition attempts by a first transceiver which may be in an OOS state.

At step 702, the wireless communication device 202 may determine if more than one transceiver is available and/or operational on the wireless communication device 202. If less than two transceivers are available, the method proceeds to a normal or unmodified network search at step 714 and subsequent acquisition at step 712.

At step 704, the wireless communication device 202 may determine if a second transceiver is currently active. The second transceiver may be active when transmitting or receiving RF signals to an access point. If the second transceiver is inactive, the method may proceed to a normal or unmodified network search at step 714 and subsequent acquisition at step 712.

At step 706, the wireless communication device 202 may determine one or more frequencies at which the first transceiver of a wireless device is susceptible to interference generated by a second transceiver of the wireless device. The first transceiver may be susceptible to the interference due to the potential transmission of the interference through one or more circuits within the wireless device 202. The interference may be present in the first transceiver because of transmission of the interference through the one or more circuits of the wireless device 202. The interference may be generated by the second transceiver when the second transceiver is communicating on the one or more frequencies.

At step 708, the wireless communication device 202 may modify a search for a RAN conducted by the first transceiver. The search may be modified based on the one or more frequencies at which the first transceiver is determined to be susceptible to the interference. The search for the RAN may be modified by determining an estimate of a power level of the interference. The search for the RAN may be modified by increasing a threshold power level based on the estimate of the power level of the interference. The threshold power level may be used to determine presence of a pilot signal.

In some embodiments, increasing the threshold power level includes increasing the threshold power level from a first power level greater than thermal noise power in the first transceiver to a second power level greater than the estimate of the power level of the interference. The estimate of the power level of the interference may be determined by modeling the interference generated in the first transceiver by the second transceiver based on a list of frequencies associated with one or more subscriptions of the wireless device. In one example, modeling includes performing one or more calculations of interference power at each frequency or frequency band in the list. The calculations may use an empirically-derived model, or a model obtained from device simulations. Empirically derived models may be generated based on tests performed on manufactured devices.

In some embodiments, the list of frequencies includes frequencies corresponding to one or more recently connected RANs. The list of frequencies may include frequencies provided by a network operator to be used for searching for the RAN. The list of frequencies may include frequencies determined by an access terminal to be afflicted by interference.

In some embodiments, modifying the search for the RAN includes modifying an order of searching a plurality of frequencies identified in a list of frequencies. The list of frequencies may include frequencies corresponding to one or more recently connected radio access networks. The frequencies may include frequencies provided by a network operator to be used for searching for the radio access network. The order of searching the plurality of frequencies may be modified by prioritizing a first set of frequency bands that are identified by an access terminal as being free from interference from the second transceiver. The order of searching the plurality of frequencies may be modified by searching in the first set of frequency bands before searching in a second set of frequency bands that are not identified by the access terminal as being free from interference from the second transceiver.

In some embodiments, the wireless communication device 202 may determine an estimate of a power level of the interference and establish a threshold power level based on the estimate of the power level of the interference. The wireless communication device 202 may search in one or more of the second set of frequency bands for pilot signals that have a signal power level that exceeds the threshold power level if no acquisition candidate is found in the first set of frequency bands.

In some embodiments, the wireless communication device 202 may modify the search for the RAN by searching for pilot signals at the one or more frequencies while the wireless device is camped on a RAN through the first transceiver. In some embodiments, the wireless communication device 202 may search for pilot signals at the one or more frequencies while the first transceiver is out of service.

In some embodiments, the wireless communication device 202 may perform a network reselection when the search for the RAN identifies a pilot signal and when the wireless communication device 202 is camped through the first transceiver on a radio access network that is afflicted by interference. The identified pilot signal may be at a frequency that is not included in the one or more frequencies determined to be susceptible to the interference. The identified pilot signal may be at a frequency that is not included in a list prioritizing radio access networks arranged in order of increasing interference power.

At step 710, the wireless communication device 202 may perform a modified search for a RAN through the first transceiver. The search may be modified based on the one or more frequencies at which the first transceiver is determined to be susceptible to the interference. In some embodiments, a RAN identified in the search may be acquired by the wireless communication device 202. The RAN may be identified based on an RF signal received by an antenna. The RF signal may be a pilot signal. The RF signal may have a power level that exceeds a modified threshold power level that accounts for potential interference generated by the second transceiver. In some embodiments, a second set of frequency bands is searched if no acquisition candidate is found in a first set of frequency bands that is identified as likely to be free from interference.

At step 712, the wireless communication device 202 may initiate an acquisition of an identified RAN through the first transceiver.

Figure 8:
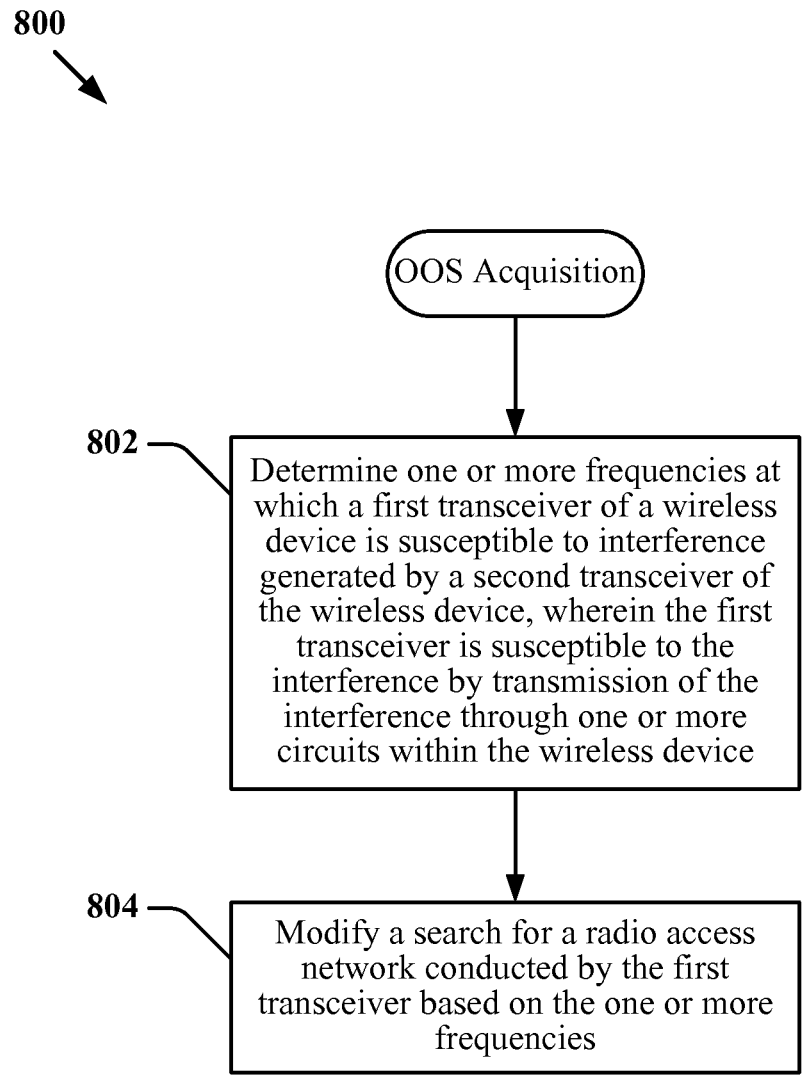
FIG. 8 is a flow chart illustrating a second example of a method for enhanced out-of-service frequency scanning and system selection for dual-subscription, dual-active devices.

FIG. 8 is a flowchart 800 illustrating a method of wireless communication, applicable to a wireless communication device such as access terminal 202 that comprises two or more transceivers, each transceiver having at least one RF chain 222 and 224. The method may be performed for network acquisition attempts by a first transceiver which may be in an OOS state.

At step 802, the wireless device 202 may determine one or more frequencies at which a first transceiver of the wireless device is susceptible to interference generated by a second transceiver of the wireless device. The interference may be generated by the second transceiver when the second transceiver is communicating on the one or more frequencies.

At step 802, the wireless device 202 may modify a search for a RAN conducted by the first transceiver based on the one or more frequencies. The first transceiver may be susceptible to the interference by transmission of the interference through one or more circuits within the wireless device 202. The search for the RAN may be modified by determining an estimate of a power level of the interference, and increasing a threshold power level based on the estimate of the power level of the interference. The threshold power level may be used to determine whether a pilot signal is present. The pilot signal may be an RF signal that has a power level that exceeds the threshold power level. A RAN may be selected for acquisition based on detection of the pilot signal. The threshold power level may be increased from a power level greater than thermal noise power in the first transceiver that is measured, calculated or otherwise determined. The threshold power level may be increased to a power level greater than the estimate of the power level of the interference.

The power level of the interference may be estimated using a model of the interference generated in the first transceiver by the second transceiver, and estimates may be made for a list of frequencies associated with one or more subscriptions of the wireless device. The list of frequencies may correspond to frequencies associated with one or more RAN to which the wireless device 202 has been recently connected. At least some of the list of frequencies may be provided by a network operator for the purpose of searching for RANs. The search for the RAN may include modifying an order or sequence of searching a plurality of frequencies identified in a list of frequencies. Some frequencies in the list of frequencies may correspond to one or more recently connected radio access networks.

Modifying the order of searching the plurality of frequencies may include prioritizing a first set of frequency bands that are identified by an access terminal as being free from interference from the second transceiver, and searching in the first set of frequency bands before searching in a second set of frequency bands that are not identified by the access terminal as being free from interference from the second transceiver. The second set of frequency bands may be searched if no acquisition candidate is found in the first set of frequency bands. An estimate of a power level of the interference may be determined and a threshold power level may be established based on the estimate of the power level of the interference. One or more of the second set of frequency bands may be searched for pilot signals that have a signal power level that exceeds the threshold power level if no acquisition candidate is found in the first set of frequency bands.

The wireless device 202 may search for pilot signals associated with one or more RANs at the one or more frequencies while the wireless device is already camped on a RAN through the first transceiver. A network reselection may be performed if the search for a RAN identifies a pilot signal when the wireless device is camped through the first transceiver on a RAN that is afflicted by interference. The wireless device 202 may search for pilot signals while the one or more frequencies while the first transceiver is out of service.

Figure 9:
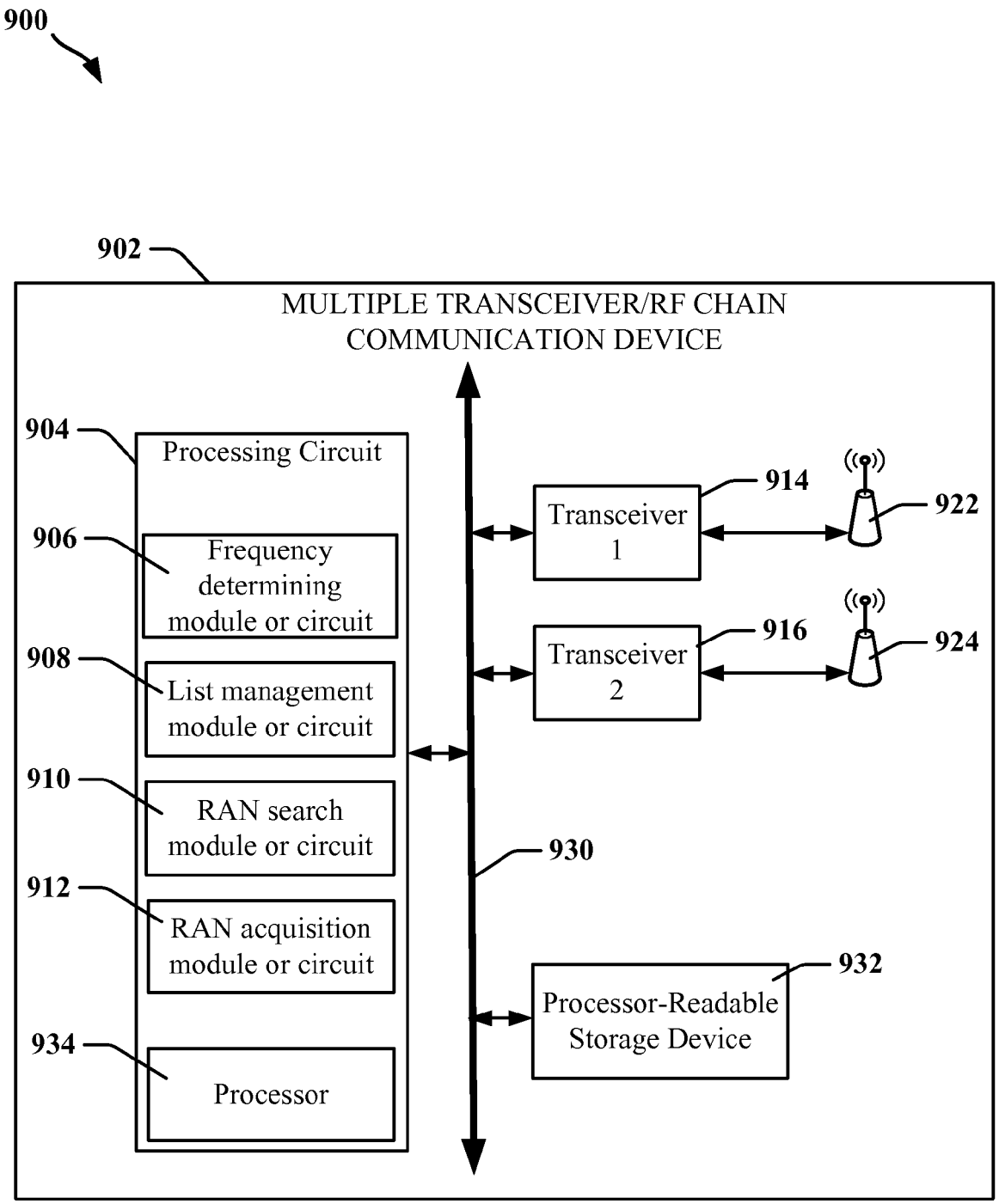
FIG. 9 is a schematic diagram an example of a hardware implementation of a wireless communication device according to certain aspects of the disclosure.

FIG. 9 is a diagram 900 illustrating an example of a hardware implementation for an apparatus 902 employing a processing circuit 904. The processing circuit 904 may be implemented with a bus architecture, represented generally by the bus 930. The bus 930 may include any number of interconnecting buses and bridges depending on the application and attributes of the processing circuit 904 and overall design constraints. The bus 930 may link together various circuits including one or more processors and/or hardware modules, processing circuit 904, and the processor-readable medium 932. The bus 930 may also link various other circuits such as timing sources, peripherals, voltage regulators, and power management circuits, which are well known in the art, and therefore, will not be described any further.

The processing circuit 904 may be coupled to one or more transceivers 914, 916. The transceivers 914, 916 may be coupled to one or more antennas 922, 924. The transceivers 914, 916 provide a means for communicating with various other apparatus over a transmission medium. The processing circuit 904 may include one or more processors 934 responsible for general processing, including the execution of software stored on the processor-readable medium 932. The software, when executed by the processing circuit 904, causes the processing circuit 904 to perform certain of the various functions described supra for any particular apparatus. The processor-readable medium 932 may also be used for storing data that is manipulated by the processing circuit 904 when executing software. The processing circuit 904 further includes at least one of the modules 906, 908, 910 and 912. The modules may be software modules running on the processing circuit 904, resident/stored in the computer readable medium 932, one or more hardware modules coupled to the processing circuit 904, or some combination thereof. The processing circuit 904 may be a component of an access terminal 202.

In one configuration, the apparatus 902 for wireless communication includes means 906, 914, 916 for determining one or more frequencies at which a first transceiver 914 is susceptible to interference generated by a second transceiver 916, means 904, 908, 932 for modifying a search for a radio access network conducted through the first transceiver 914 based on the one or more frequencies, means 910, 914, 922 for searching for a pilot signal of a RAN, and means 912, 914, 922 for acquiring a RAN.

The term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other. For instance, a first die may be coupled to a second die in a package even though the first die is never directly physically in contact with the second die.

The terms wafer and substrate may be used herein to include any structure having an exposed surface with which to form an IC according to aspects of the present disclosure. The term "die" may be used herein to include an IC. A die may include one or more circuits. The term substrate is understood to include semiconductor wafers. The term substrate is also used to refer to semiconductor structures during fabrication, and may include other layers that have been fabricated thereupon. The term substrate includes doped and undoped semiconductors, epitaxial semiconductor layers supported by a base semiconductor, or semiconductor layers supported by an insulator, as well as other semiconductor structures well known to one skilled in the art. The term insulator is defined to include any material that is less electrically conductive than materials generally referred to as conductors by those skilled in the art. The term "unit" may refer to a component that is part of a die and/or circuit of a die. A unit may be located in one die or a unit may be part of a semiconductor device, system and/or package that is distributed over several dice and/or circuits. Thus, a unit may refer to a component that is physically and/or logically located in several locations.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 and 9 may be configured to perform one or more of the methods, features, or steps described herein. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of wireless communication, comprising:
determining one or more frequencies at which a first transceiver of a wireless device is susceptible to interference generated by a second transceiver of the wireless device; and
modifying a search for a radio access network conducted using the first transceiver based on the one or more frequencies, wherein modifying the search for the radio access network comprises:
determining an estimate of a power level of the interference;
increasing a threshold power level based on the estimate of the power level of the interference, wherein the threshold power level is used to determine a presence of a pilot signal; and
prioritizing a first set of frequency bands that are identified as being free from the interference from the second transceiver; and
searching in the first set of frequency bands before searching in a second set of frequency bands for pilot signals having a signal power level that exceeds the increased threshold power level, wherein the second set of frequency bands includes the one or more frequencies determined to be susceptible to the interference from the second transceiver;
wherein the first transceiver is susceptible to the interference by transmission of the interference through one or more circuits within the wireless device.

2. The method of claim 1, further comprising:
selecting a radio access network for acquisition by the first transceiver based on at least one of the pilot signals received by an antenna having the signal power level that exceeds the increased threshold power level.

3. The method of claim 1, wherein:
increasing the threshold power level includes increasing the threshold power level from a first power level greater than thermal noise power in the first transceiver to a second power level greater than the estimate of the power level of the interference.

4. The method of claim 1, wherein determining the estimate of the power level of the interference includes modeling the interference generated in the first transceiver by the second transceiver based on a list of frequencies associated with one or more subscriptions of the wireless device.

5. The method of claim 4, wherein the list of frequencies includes frequencies corresponding to one or more recently connected radio access networks.

6. The method of claim 4, wherein the list of frequencies includes frequencies provided by a network operator to be used for searching for the radio access network.

7. The method of claim 1, wherein searching in the second set of frequency bands for pilot signals having a signal power level that exceeds the increased threshold power level comprises searching in the second set of frequency bands if no acquisition candidate is found in the first set of frequency bands.

8. The method of claim 1, wherein searching in the second set of frequency bands for pilot signals having a signal power level that exceeds the increased threshold power level comprises searching for the pilot signals at the one or more frequencies while the wireless device is camped on a radio access network through the first transceiver.

9. The method of claim 1, further comprising performing a network reselection when the wireless device is camped through the first transceiver on a radio access network that is afflicted by interference, and when the search for the radio access network identifies a pilot signal associated with low or lower expectations of interference issues.

10. The method of claim 1, wherein searching in the second set of frequency bands for pilot signals having a signal power level that exceeds the increased threshold power level comprises searching for the pilot signals at the one or more frequencies while the first transceiver is out of service.

11. The method of claim 1, wherein the interference is generated by the second transceiver when the second transceiver is communicating on the one or more frequencies.

12. An apparatus for wireless communication, comprising:
means for determining one or more frequencies at which a first transceiver of a wireless device is susceptible to interference generated by a second transceiver of the wireless device; and
means for modifying a search for a radio access network conducted using the first transceiver based on the one or more frequencies, wherein means for modifying the search for the radio access network comprises:
means for determining an estimate of a power level of the interference;
means for increasing a threshold power level based on the estimate of the power level of the interference, wherein the threshold power level is used to determine presence of a pilot signal; and
means for prioritizing a first set of frequency bands that are identified as being free from the interference from the second transceiver; and
means for searching in the first set of frequency bands before searching in a second set of frequency bands for pilot signals having a signal power level that exceeds the increased threshold power level, wherein the second set of frequency bands includes the one or more frequencies determined to be susceptible to the interference from the second transceiver;
wherein the first transceiver is susceptible to the interference by transmission of the interference through one or more circuits within the wireless device.

13. The apparatus of claim 12, further comprising:
an antenna; and
means for selecting a radio access network for acquisition by the first transceiver based on at least one of the pilot signals received by the antenna having the signal power level that exceeds the increased threshold power level.

14. The apparatus of claim 12, wherein means for modifying the search for the radio access network comprises means for increasing the threshold power level from a first power level greater than thermal noise power in the first transceiver to a second power level greater than the estimate of the power level of the interference.

15. The apparatus of claim 12, wherein means for determining the estimate of the power level of the interference comprises means for modeling the interference generated in the first transceiver by the second transceiver based on a list of frequencies associated with one or more subscriptions of the wireless device.

16. The apparatus of claim 15, wherein the list of frequencies includes frequencies corresponding to one or more recently connected radio access networks.

17. The apparatus of claim 15, wherein the list of frequencies includes frequencies provided by a network operator to be used for searching for the radio access network.

18. The apparatus of claim 12, wherein means for searching in the second set of frequency bands for pilots signals having a signal power level that exceeds the increased threshold power level comprises means for searching in the second set of frequency bands if no acquisition candidate is found in the first set of frequency bands.

19. The apparatus of claim 12, wherein means for searching in the second set of frequency bands for pilot signals having a signal power level that exceeds the increased threshold power level comprises means for searching for the pilot signals at the one or more frequencies while the wireless device is camped on a radio access network through the first transceiver.

20. The apparatus of claim 12, further comprising means for performing a network reselection, wherein the network reselection is performed when the wireless device is camped through the first transceiver on a radio access network that is afflicted by interference, and when the search for the radio access network identifies a pilot signal associated with low or lower expectations of interference issues.

21. The apparatus of claim 12, wherein means for searching in the second set of frequency bands for pilot signals having a signal power level that exceeds the increased threshold power level comprises means for searching for the pilot signals at the one or more frequencies while the first transceiver is out of service.

22. The apparatus of claim 12, wherein the interference is generated by the second transceiver when the second transceiver is communicating on the one or more frequencies.

23. An apparatus for wireless communication, comprising:
a processing circuit configured to:
determine one or more frequencies at which a first transceiver of a wireless device is susceptible to interference generated by a second transceiver of the wireless device; and modify a search for a radio access network conducted using the first transceiver based on the one or more frequencies by:
- determining an estimate of a power level of the interference;
- increasing a threshold power level based on the estimate of the power level of the interference, wherein the threshold power level is used to determine presence of a pilot signal; and
- prioritizing a first set of frequency bands that are identified as being free from the interference from the second transceiver; and
- search in the first set of frequency bands before searching in a second set of frequency bands for pilot signals having a signal power level that exceeds the increased threshold power level, wherein the second set of frequency bands includes the one or more frequencies determined to be susceptible to the interference from the second transceiver;

wherein the first transceiver is susceptible to the interference by transmission of the interference through one or more circuits within the wireless device.

24. The apparatus of claim 23, further comprising an antenna and wherein the processing circuit is further configured to:
select a radio access network for acquisition by the first transceiver based on an RF signal received by an antenna having the signal power level that exceeds the increased threshold power level.

25. The apparatus of claim 23, wherein to increase the threshold power level the processing circuit is configured to increase the threshold power level from a first power level greater than thermal noise power in the first transceiver to a second power level greater than the estimate of the power level of the interference.

26. The apparatus of claim 23, wherein to determine the estimate of the power level of the interference the processing circuit is configured to model the interference generated in the first transceiver by the second transceiver based on a list of frequencies associated with one or more subscriptions of the wireless device.

27. The apparatus of claim 26, wherein the list of frequencies includes frequencies corresponding to one or more recently connected radio access networks.

28. The apparatus of claim 26, wherein the list of frequencies includes frequencies provided by a network operator to be used for searching for the radio access network.

29. The apparatus of claim 23, wherein to search in the second set of frequency bands for pilots signals having a signal power level that exceeds the increased threshold power level the processing circuit is configured to:
search in the second set of frequency bands if no acquisition candidate is found in the first set of frequency bands.

30. The apparatus of claim 23, wherein to search in the second set of frequency bands for pilot signals having a signal power level that exceeds the increased threshold power level the processing circuit is configured to search for the pilot signals at the one or more frequencies while the wireless device is camped on a radio access network through the first transceiver.

31. The apparatus of claim 23, wherein the processing circuit is further configured to perform a network reselection when the wireless device is camped through the first transceiver on a radio access network that is afflicted by interference, and when the search for the radio access network identifies a pilot signal associated with low or lower expectations of interference issues.

32. The apparatus of claim 23, wherein to search in the second set of frequency bands for pilot signals having a signal power level that exceeds the increased threshold power level the processing circuit is configured to search for the pilot signals at the one or more frequencies while the first transceiver is out of service.

33. The apparatus of claim 23, wherein the interference is generated by the second transceiver when the second transceiver is communicating on the one or more frequencies.

34. A non-transitory processor-readable storage medium having stored thereon one or more instructions which, when executed by at least one processing circuit, cause the at least one processing circuit to:
determine one or more frequencies at which a first transceiver of a wireless device is susceptible to interference generated by a second transceiver of the wireless device; and
modify a search for a radio access network conducted using the first transceiver based on the one or more frequencies by:
- determining an estimate of a power level of the interference;
- increasing a threshold power level based on the estimate of the power level of the interference, wherein the threshold power level is used to determine presence of a pilot signal; and
- prioritizing a first set of frequency bands that are identified as being free from the interference from the second transceiver; and
- search in the first set of frequency bands before searching in a second set of frequency bands for pilot signals having a signal power level that exceeds the increased threshold power level, wherein the second set of frequency bands includes the one or more frequencies determined to be susceptible to the interference from the second transceiver;

wherein the first transceiver is susceptible to the interference by transmission of the interference through one or more circuits within the wireless device.

35. The processor-readable storage medium of claim 34, further comprising one or more instructions which, when executed by at the least one processing circuit, cause the at least one processing circuit to:
select a radio access network for acquisition by the first transceiver based on at least one of the pilot signals received by an antenna having the signal power level that exceeds the increased threshold power level.

36. The processor-readable storage medium of claim 34, wherein the one or more instructions cause the at least one processing circuit to increase the threshold power level by increasing the threshold power level from a first power level greater than thermal noise power in the first transceiver to a second power level greater than the estimate of the power level of the interference.

37. The processor-readable storage medium of claim 34, wherein the one or more instructions cause the at least one processing circuit to determine the estimate of the power level of the interference by modeling the interference generated in the first transceiver by the second transceiver based on a list of frequencies associated with one or more subscriptions of the wireless device.

38. The processor-readable storage medium of claim 37, wherein the list of frequencies includes frequencies corresponding to one or more recently connected radio access networks.

39. The processor-readable storage medium of claim 37, wherein the list of frequencies includes frequencies provided by a network operator to be used for searching for the radio access network.

40. The processor-readable storage medium of claim 34, further comprising one or more instructions which, when executed by at the least one processing circuit, cause the at least one processing circuit to search in the second set of frequency bands for pilot signals having a signal power level that exceeds the increased threshold power level by searching in the second set of frequency bands if no acquisition candidate is found in the first set of frequency bands.

41. The processor-readable storage medium of claim 34, wherein the one or more instructions cause the at least one processing circuit to search in the second set of frequency bands for pilot signals having a signal power level that exceeds the increased threshold power level by searching for the pilot signals at the one or more frequencies while the wireless device is camped on a radio access network through the first transceiver.

42. The processor-readable storage medium of claim 34, wherein the one or more instructions cause the at least one processing circuit to perform a network reselection when the wireless device is camped through the first transceiver on a radio access network that is afflicted by interference, and when the search for the radio access network identifies a pilot signal associated with low or lower expectations of interference issues.

43. The processor-readable storage medium of claim 34, wherein the one or more instructions cause the at least one processing circuit to search in the second set of frequency bands for pilot signals having a signal power level that exceeds the increased threshold power level by searching for the pilot signals at the one or more frequencies while the first transceiver is out of service.

44. The processor-readable storage medium of claim 34, wherein the interference is generated by the second transceiver when the second transceiver is communicating on the one or more frequencies.

* * * * *